May 20, 1930.   R. MERCIER   1,759,318
DEVICE FOR THE DISTANT TRANSMISSION OF ORDERS
Filed July 11, 1929   2 Sheets-Sheet 2
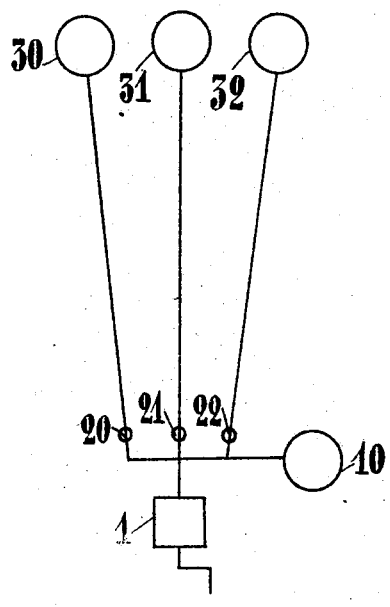
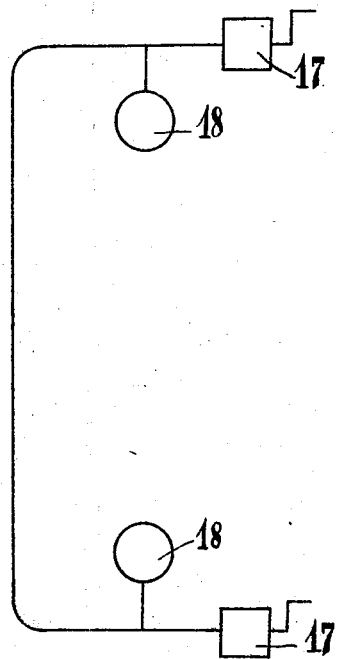
INVENTOR
René Mercier
BY
Emil Börmelycke
ATTORNEY Patented May 20, 1930

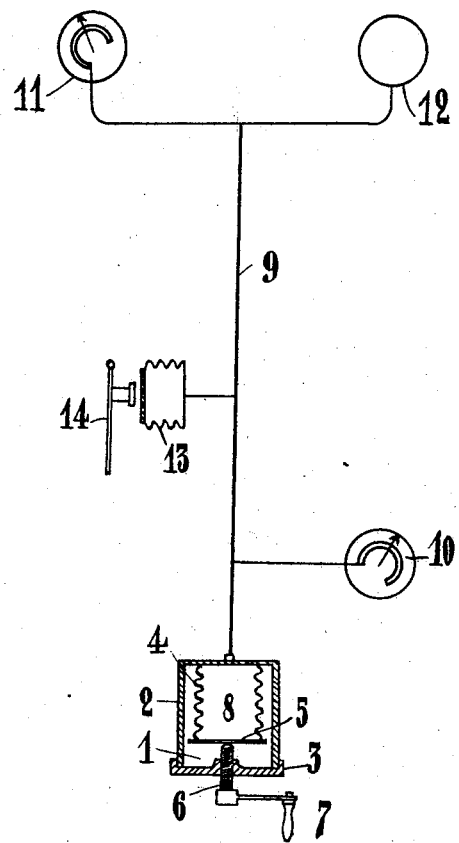
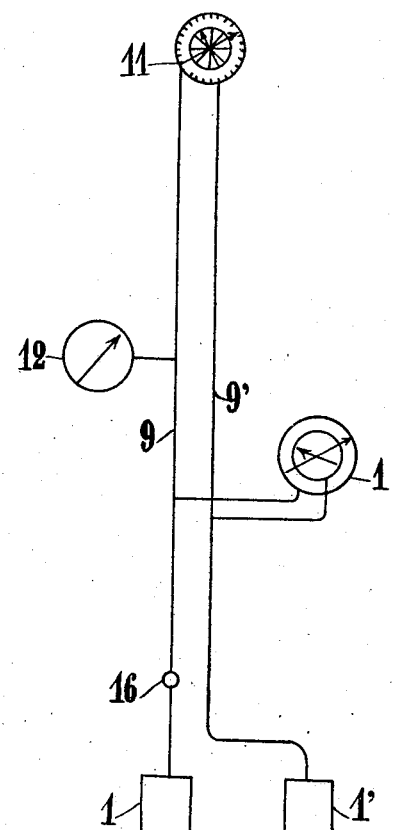
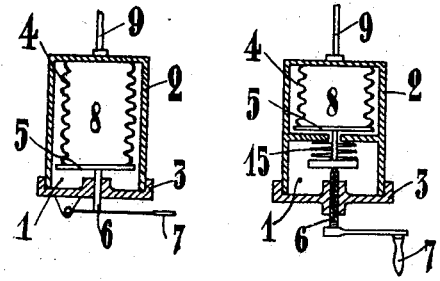
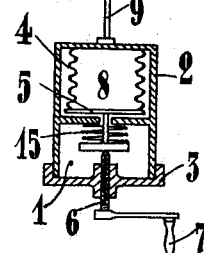

1,759,318

UNITED STATES PATENT OFFICE

RENÉ MERCIER, OF PARIS, FRANCE, ASSIGNOR TO ETABLISSEMENTS AERA, OF PARIS, FRANCE

DEVICE FOR THE DISTANT TRANSMISSION OF ORDERS

Application filed July 11, 1929, Serial No. 377,554, and in France August 1, 1928.

The problem of distant transmission of orders or of any indications or signals, the practical uses of which are many, has already suggested numerous devices.

While precise and complete, electrical methods utilizing a subservient motor, are intricate and too expensive in a number of cases. For certain uses, where so great a degree of accuracy is not required or where transmission to a short distance only is desired, various simple mechanical methods have been proposed. Awkward in practice for transmission to a plurality of stations, they are deficient in responsivity.

The hydraulic method which the present invention involves combines with the utmost simplicity of mechanical devices, great installation facilities and ready adaptation to multiple stations. It is usable for the transmission of orders or of indications of any character.

The invention consists essentially in hydraulically transmitting a pressure exerted on a central vessel or reservoir to any number of identical manometers, one of which serves as a telltale for the operator.

The assemblage of devices and piping constitutes a tight enclosure completely filled with incompressible liquid and, therefore, a pressure exerted at one point will be transmitted to all the points throughout the enclosure so long as the liquid retains its fluid properties.

In this manner all possible errors due to temperature, to exterior pressure, etc. are eliminated. As a matter of fact, if, consequent upon a rise in temperature, the operator perceives that the pointer of the telltale manometer is no longer at zero, he has merely to restore the pressure within the enclosure to its initial value by regulating the transmitting capacity in order that all the manometers will return to their zero position. To any given pressure within the system corresponds one position, and only one, of the pointers of the manometers. As will be apparent, application of the system can be extended to any number of receivers and of transmitters on one and the same system of piping.

In the accompanying drawings:

Figure 1 is a diagrammatic view, with parts in section, of a hydraulic transmitter comprising a pressure regulating device for the liquid contained in the piping system;

Figs. 2 and 3 show two modified forms of signalling box;

Fig. 4 is a diagrammatic view of a hydraulic transmitter with a central, double control;

Fig. 5 shows a transmitter for multiple signal stations, each of them capable of being isolated from the column of liquid;

Fig. 6 shows the use of the signalling system with a single piping between two operators.

The device essentially comprises a pressure transmitting resilient vessel 1 connected through piping with any number of manometers, such as 10, 11, 12, the whole constituting a tight enclosure or container completely filled with a suitably selected liquid.

As an example, the pressure sender may be constituted (Figure 1) by a rigid box 2 fitted at one end with a cover or lid 3. On the other end of said box 2 there is soldered a diaphragm 4 provided with a rigid cover plate 5.

From the latter end of the thus constituted and liquid-filled reservoir 8 leads a common piping 9 leading to the manometers 10, 11 and 12; the manometer 10 serving as a telltale for the operator, and the other two 11, 12 as receivers of emitted signals. Through cover 3 passes a screw 6 adapted to bear at its tip on plate 5 and the other end of which is provided with a crank or with a pusher 7. When the crank is operated, the screw tip is caused to press on diaphragm 4.

The inside pressure is thereby increased, resulting in a shifting of all the manometer pointers. Pressure on vessel 8 might also be obtained, instead of mechanically, through some fluid compressed by means of an exterior pump (not shown) in the space between vessel 8 and box 2, which box is rendered tight.

The liquid contents confined within the tight enclosure may be under any initial pressure without the arrangement or device characteristic of the invention being modified; the only requirement being that all the manometers be caused to give one and the same indication or any one and the same inner pressure.

In order to facilitate filling or adjustment, or in order to assist in compensating temperature and to avoid exaggerated motions of the control lever when the temperature varies much, I provide on the piping an auxiliary resilient vessel 13.

Vessel 13 may also be used for making calls, as, for instance, by means of a lever such as 14 exerting a pressure thereon.

The travel of screw 6 may be limited by any suitable means, say by the length of the threaded part thereof, in view of avoiding exaggerated distortions of the pressure vessel 8.

Figure 2 shows a modification of the device illustrated by Figure 1, with control by a lever instead of by a screw.

Figure 3 represents another modification in which the resilient diaphragm 4 is initially set by a spring 15 in view of altering the point of resilient operation of the diaphragm or in order to assist refilling and adjustment.

The manometers or gauges may be of any sort, or of the diaphragm or the tube type; they are fitted with identical dials marked either with control indications or with graduations or with both.

The invention is calculated to solve problems as to transmission.

As an example, Figure 4 shows a central, double control; the operator may operate the two hereinbefore described pressure transmitters 1 and 1', one of which transmits directions and the other the figures of a graduation. The indications transmitted through two different pipings 9 9' are received by two manometers 11, 12, preferably by manometers having two concentric pointers, one of said manometers serving as a telltale and fitted with a dial marked with double indications.

Such a device is useful in aerial navigation where a pilot has to be telegraphed commands and angles for course-trueing or correction of course for drift by means of apparatus of reduced size.

A cock 16 may be provided on the piping for maintaining the angle reading or indication, for instance, for as long as it is desired to have it remain before the pilot's sight (manometer 11) while leaving the command transmission available.

Figure 5 represents a diagram of a transmission from the main or central transmitter 1 to various stations 30, 31, 32 through separated pipings which can be isolated by cocks 20, 21, 22.

Figure 6 is a diagram showing the device applied to cross-telegraphing of signals through a single piping between two operators at different stations 17.

I claim as my invention:

1. A hydraulic telegraph for the distant transmission of signals, comprising a closed system filled with liquid and embodying piping, a pressure transmitter communicating with said piping and acting in liquid-tight manner on the liquid, and indicating manometers branched on the piping to receive the pressure impulses transmitted through the liquid by the transmitter.

2. A hydraulic telegraph according to claim 1, in which the pressure transmitter comprises a closed box, an expansible and contractible diaphragm therewithin secured at one end to the box and having a rigid closure plate at the other end, the first-named end communicating with the interior of the piping through an orifice in the adjacent wall of the box, and means for varying the volumetric capacity of the diaphragm.

3. A hydraulic telegraph according to claim 1, in which the pressure transmitter comprises a closed box, an expansible and contractible diaphragm therewithin secured at one end to the box and having a rigid closure plate at the other end, the first-named end communicating with the interior of the piping through an orifice in the adjacent wall of the box, and a member mounted for endwise movement in said box and bearing at its tip against said closure plate to vary the volumetric capacity of the diaphragm.

4. A hydraulic telegraph according to claim 1, in which the pressure transmitter comprises a closed box, an expansible and contractible diaphragm therewithin secured at one end to the box and having a rigid closure plate at the other end, the first-named end communicating with the interior of the piping through an orifice in the adjacent wall of the box, and an endwise-movable screw mounted in said box for exerting pressure on the closure plate of the diaphragm to vary the volumetric capacity of the latter.

5. A hydraulic telegraph according to claim 1, in which the pressure transmitter comprises a closed box, an expansible and contractible diaphragm therewithin secured at one end to the box and having a rigid closure plate at the other end, the first-named end communicating with the interior of the piping through an orifice in the adjacent wall of the box, an endwise-movable screw mounted in said box for exerting pressure on the closure plate of the diaphragm to vary the volumetric capacity of the latter, said screw having a spring interposed between its tip and the closure plate to impose a predetermined initial tension on the diaphragm.

In testimony whereof, I affix my signature.

RENÉ MERCIER.